United States Patent
Gallé et al.

(10) Patent No.: US 10,546,009 B2
(45) Date of Patent: Jan. 28, 2020

(54) SYSTEM FOR MAPPING A SET OF RELATED STRINGS ON AN ONTOLOGY WITH A GLOBAL SUBMODULAR FUNCTION

(71) Applicant: Conduent Business Services, LLC, Dallas, TX (US)

(72) Inventors: Matthias Gallé, Saint-Martin-d'Hères (FR); Nikolaos Lagos, Grenoble (FR)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 481 days.

(21) Appl. No.: 14/520,637

(22) Filed: Oct. 22, 2014

(65) Prior Publication Data

US 2016/0117325 A1    Apr. 28, 2016

(51) Int. Cl.
*G06F 16/36* (2019.01)

(52) U.S. Cl.
CPC ................................. *G06F 16/367* (2019.01)

(58) Field of Classification Search
CPC ............... G06F 17/30867; G06F 19/28; G06F 17/30539; G06F 17/30557; G06F 19/16; G06F 11/30; G06F 16/367
See application file for complete search history.

(56) References Cited

U.S. PATENT DOCUMENTS

| | | | |
|---|---|---|---|
| 2011/0040766 A1* | 2/2011 | Robinson | G06F 17/3053 707/749 |
| 2011/0264649 A1* | 10/2011 | Hsiao | G06N 5/022 707/722 |
| 2013/0013603 A1* | 1/2013 | Parker | G06F 16/355 707/737 |
| 2013/0054621 A1* | 2/2013 | Kretz | G06F 16/367 707/749 |
| 2013/0132365 A1* | 5/2013 | Chang | G06Q 30/0241 707/710 |
| 2014/0075004 A1* | 3/2014 | Van Dusen | H04L 41/04 709/223 |

(Continued)

OTHER PUBLICATIONS

U.S. Appl. No. 14/518,361, filed Oct. 20, 2014, Matthias Gallé, et al.

(Continued)

*Primary Examiner* — Mariela Reyes
*Assistant Examiner* — Courtney Harmon
(74) *Attorney, Agent, or Firm* — Fay Sharpe LLP

(57) ABSTRACT

A computer-implemented system and method provide for mapping a set of strings onto an ontology which may be represented as a graph. The method includes receiving a set of strings, each string denoting a respective object. For each of the strings, a pairwise similarity is computed between the string and each of a set of objects in the ontology. For each of a set of candidate subsets (subgraphs) of the set of objects, a global score is computed, which is a function of the pairwise similarities between the strings and the objects in the subset and a tightness score. The tightness score is computed on the objects in the subset with a submodular function. An optimal subset is identified from the set of candidate subsets based on the global scores. Strings in the set of strings are mapped to the objects in the optimal subset, based on the pairwise similarities.

18 Claims, 3 Drawing Sheets

(56) References Cited

U.S. PATENT DOCUMENTS

| | | | |
|---|---|---|---|
| 2014/0279971 A1* | 9/2014 | Bobick | G06F 17/30864 |
| | | | 707/693 |
| 2014/0280224 A1* | 9/2014 | Feinberg | G06F 16/9024 |
| | | | 707/748 |
| 2014/0351261 A1* | 11/2014 | Aswani | G06F 17/30958 |
| | | | 707/741 |

OTHER PUBLICATIONS

U.S. Appl. No. 14/520,458, filed Oct. 22, 2014, Matthias Gallé, et al.

Buchbinder, et al., "A tight linear time (1/2)-approximation for unconstrained submodular maximization," 2012 IEEE 53rd Annual Symp. on Foundations of Computer Science (FOCS), pp. 649-658 (2012).

Cruz, et al., "Using agreement-maker to align ontologies for OAEI 2011," OM vol. 814 of CEUR Workshop Proceedings, pp. 1-8 (2011).

Cucerzan, "Large-Scale Named Entity Disambiguation Based on Wikipedia Data," EMNLP-CoNLL, pp. 708-716 (2007).

Elmagarmid, et al., "Duplicate Record Detection: A Survey," IEEE Trans. on Knowledge and Data Engineering, vol. 19(1), pp. 1-16 (2007).

Feige, et al., "The Dense k—Subgraph Problem," Algorithmica, vol. 29(3), pp. 410-421 (2001).

Ferrara, et al., "Evaluation of Instance Matching Tools: The Experience of OAEI," Web Semantics: Science, Services and Agents on the World Wide Web, 20(1) pp. 1-18 (2013).

Ferrara, et al., "Data Linking for the Semantic Web," Int. J. Semantic Web Inf. Syst., vol. 7(3), pp. 46-76 (2011).

Goldberg, "Finding a Maximum Density Subgraph," Technical Report, Berkeley, CA, pp. 1-14 (1984).

Hoffart, et al., "Robust Disambiguation of Named Entities in Text," Proc. 2011 Conf. on Empirical Methods in Natural Language Processing (EMNLP '11), pp. 782-792 (2011).

Jean-Mary, et al., "Ontology Matching with Semantic Verification," Web Semantics: Science, Services and Agents on the World Wide Web, vol. 7(3), pp. 235-251 (2009).

Melnik, et al., "Similarity Flooding: A Versatile Graph Matching Algorithm and its Application to Schema Matching," Proc.$18^{th}$ Intern'l Conf. on Data Engineering (ICDE '02), pp. 117-129 (2002).

Milne, et al., "Learning to Link with Wikipedia," Proc.$17^{th}$ ACM Conf. on Information and Knowledge Management (CIKM '08), pp. 509-518 (2008).

Moro, et al., "Entity linking meets word sense disambiguation: a unified approach," TACL, 2, pp. 231-244 (2014).

Ratinov, et al., "Local and Global Algorithms for Disambiguation to Wikipedia," Proc. $49^{th}$ Annual Meeting of the Assoc. for Computational Linguistics: Human Language Technologies (HLT '11), vol. 1, pp. 1375-1384 (2011).

Schopman, et al., "Instance-based ontology matching by instance enrichment," J. Data Semantics, vol. 1(4), pp. 219-236 (2012).

Tsourakakis, et al., "Denser than the densest subgraph: Extracting optimal quasi-cliques with quality guarantees," Proc.$19^{th}$ ACM SIGKDD International Conference on Knowledge Discovery and Data Mining (KDD '13), pp. 104-112 (2013).

Wikipedia, "Submodular set function," downloaded at http://en.wikipedia.org/wiki/Submodular_set_function, on Sep. 29, 2014.

* cited by examiner

SYSTEM FOR MAPPING A SET OF RELATED STRINGS ON AN ONTOLOGY WITH A GLOBAL SUBMODULAR FUNCTION

BACKGROUND

The exemplary embodiment relates to concept matching and finds particular application in mapping a set of strings, each one denoting a concept, onto an existing ontology.

Recognizing that two objects actually refer to the same entity finds application in various fields, such as database construction, semantic web and natural language processing, and the like. The problem has been variously referred to as instance matching, entity co-reference, linking, de-duplication, resolution, duplicate record detection, and has been studied extensively. See, e.g., Ahmed K Elmagarmid, et al., "Duplicate record detection: A survey," IEEE Trans. on Knowledge and Data Engineering, 19(1):1-16 (2007). In a common approach, the two objects are represented in the same format, e.g., rows in a database, URI's in semantic web processing, textual mentions in natural language processing. One challenge is to recognize mentions of entities in a given text, disambiguate them, and map them to the entities in a given entity collection or knowledge base where the two objects are asymmetric: one is discovered from the text (and enriched with relationships and properties) while the other is a structured entry in a database.

Techniques for matching and linking objects that refer to the same entity often use two approaches (or their combination): local, where the matching is performed in a pair-wise manner, disambiguating each entity separately; and global, where the different candidates are disambiguated simultaneously to arrive at a coherent set of objects. See, Lev Ratinov, et al., "Local and global algorithms for disambiguation to Wikipedia," Proc. 49th Annual Meeting of the Assoc. for Computational Linguistics: Human Language Technologies—Volume 1, HLT '11, pp. 1375-1384 (2011), "Ratinov, et al."

In the case of Semantic Web matching, instance and ontology matching are specific examples. Instance matching is informally defined as a special case of the relation discovery task which takes two collections of data as input and produces a set of mappings denoting binary relations between entities which are considered equivalent one to another. See, Alfio Ferrara, et al., "Evaluation of instance matching tools: The experience of OAEI," Web Semantics: Science, Services and Agents on the World Wide Web, 21(0), (2013). Local matching techniques are based on pair-wise value matching of the properties of the instances, including the URI labels representing the objects in some cases (Alfio Ferrara, et al., "Data linking for the semantic web," Int. J. Semantic Web Inf. Syst., 7(3):46-76 (2011)). Global matching techniques take into account all individuals in two datasets and try to construct an optimal alignment between these whole sets of individuals (see, Alfio Ferrara, et al., "Data linking for the semantic web"). At this level, mutual impact of pairwise individual matching decisions are taken into account based mainly on similarity propagation techniques. The algorithms to compute these structural similarities are mainly variants of the Similarity Flooding algorithm, which performs an iterative fixed point computation where pairs of nodes propagate their similarity to their respective neighbors. See, for example, Sergey Melnik, et al., "Similarity flooding: A versatile graph matching algorithm and its application to schema matching," Proc. 18th Intern'l Conf. on Data Engineering, ICDE '02, pp. 117-129 (2002). This method assumes that two nodes are similar if their neighbors are similar. However, in the case of matching a set of strings, the notion of a "neighbor" in the input set of strings is lacking and such a symmetric assumption is not feasible.

In the case of text, the first step may include the creation of graphs representing the possible semantic interpretations of the input text. Once these graphs are constructed, graph-matching techniques are used to find a suitable mapping with a graph that represents the knowledge base. See, Johannes Hoffart, et al., "Robust disambiguation of named entities in text," Proc. Conf. on Empirical Methods in Natural Language Processing, EMNLP '11, pp. 782-792 (2011). Both context and coherence are considered. In one approach, mentions from the input text and corresponding candidate entities in the text define the context as a weighted graph (based on the co-occurrence frequency), while coherence is captured by weights calculated on the edges between entities (based also on the knowledge base used). The goal of this combined graph is the identification of a dense subgraph that contains exactly one mention-entity edge for each mention, yielding the most likely disambiguation. See, Andrea Moro, et al., "Entity linking meets word sense disambiguation: a unified approach," TACL, 2:231-244 (2014). This approach keeps the set of candidate meanings for a given mention as open as possible, so as to enable high recall in linking partial mentions. To provide an effective method for handling this high ambiguity, the degree of ambiguity has to be drastically reduced while keeping the interpretation coherence as high as possible, by computing the densest subgraph formed by the candidate meanings. The assumption is that the result will be a subgraph that contains those semantic interpretations that are most coherent to each other. However, such a method tends to miss more distant meanings.

There remains a problem with mapping lists of strings onto an ontology where the relationships between the strings are not clearly defined.

BRIEF DESCRIPTION

In accordance with one aspect of the exemplary embodiment, a method for mapping a set of strings onto an ontology includes receiving a set of strings, each string denoting a respective object. For each of the strings, a pairwise similarity is computed between the string and each of a set of objects in the ontology. For each of a set of candidate subsets of the set of objects, a global score is computed, which is a function of the pairwise similarities between the strings and the objects in the subset and a tightness score computed on the objects in the subset with a submodular function. An optimal subset is identified from the set of candidate subsets based on the global scores. Strings in the set of strings are mapped to the objects in the optimal subset based on the pairwise similarities. Information based on the mapping is output. At least one of the computing of the global score, the identifying of the optimal subset, and the mapping of the strings is may be performed with a processor.

In accordance with another aspect of the exemplary embodiment, a system for mapping a set of strings onto an ontology includes a similarity computation component which, for each of a set of received strings, computes a pairwise similarity between the string and each of a set of objects in the ontology. A scoring component, for each of a set of candidate subsets of the set of objects, computes a global score. The global score is a function of the pairwise similarities between the strings and the objects in the subset and a tightness score computed on the objects in the subset with a submodular function, and which identifies an optimal subset from the set of candidate subsets based on the global scores. A mapping component maps each of the strings in the set of strings to the objects in the optimal subset based on the pairwise similarities or to a null node when the pairwise similarity does not meet a threshold for any of the nodes in the optimal subset. An output component outputs information based on the mapping. A processor implements the similarity computation component, scoring component, mapping component, and output component.

In accordance with another aspect of the exemplary embodiment, a method for mapping a set of strings onto an ontology includes receiving a set of strings, each string denoting a respective object. An ontology in the form of a graph in which nodes are linked by edges is accessed. Each of the nodes represents a respective object. For each of the strings, a pairwise similarity is computed between the string and each the objects in the ontology. When a string from the set of strings does not meet a threshold similarity with any of the nodes in the ontology, a null node is added to the ontology and is considered as the most similar node for that string. For each of a set of candidate subsets of the set of objects, a global score is computed, which is a function of the pairwise similarities between the strings and the objects in the subset and a tightness score computed on the objects in the subset based on a distance between each pair of objects. The distance is the number of edges spacing the respective nodes. The distance between each node in the subset and the null node is set to zero. An optimal subset is identified from the set of candidate subsets based on the global scores. Strings in the set of strings are mapped to the objects in the optimal subset based on the pairwise similarities. Information based on the mapping is output.

At least one of the computing of the global score, the identifying of the optimal subset, and the mapping of the strings may be performed with a processor.

DETAILED DESCRIPTION

The exemplary embodiment includes a system and method for mapping a set of strings, each one denoting a respective object, onto an ontology which includes a set of ontology-related objects denoted by a set of linked nodes.

It is assumed that the strings in the received set of strings are all related in some way. However, the method ignores or is unaware of the relationships between the strings. For example, the strings may constitute all or a part of a list from a common source. The mapping is modeled with an optimization function whose goal is to find an optimal subset of the nodes in the target ontology to which the input strings can be mapped. The exemplary optimization function is one that balances the similarity of each string to one of these nodes (a local parameter) with a tightness score indicating how close the selected nodes are in the ontology graph (operating as a global parameter on the resulting structure). The score function thus balances content similarity of the words of the strings and nodes with the tightness of the subgraph induced on the ontology by the mapped entities. In addition, the exemplary tightness score function is submodular. This allows general techniques from combinatorial optimization to be used to find a provable good approximation to an optimal solution. That is advantageous, as optimization of global parameters can be related to efficiency issues.

The system and method find application in a variety of fields, such as structuring databases, semantic web and natural language processing, and the like. As an example application, a list of in-house terms is to be mapped to a general domain knowledge base to enrich the data.

In one exemplary embodiment, the strings are extremely short, in most cases consisting only of one or two words. The only other information to help disambiguate to which object in the ontology they relate to is the global subgroup and the fact that the strings are all potentially related to each other.

The ontology can be in the form of directed-acyclic graph, or a tree. Nodes, representing ontology objects are linked by edges, which may denote parent-child relationships.

Figure 1:
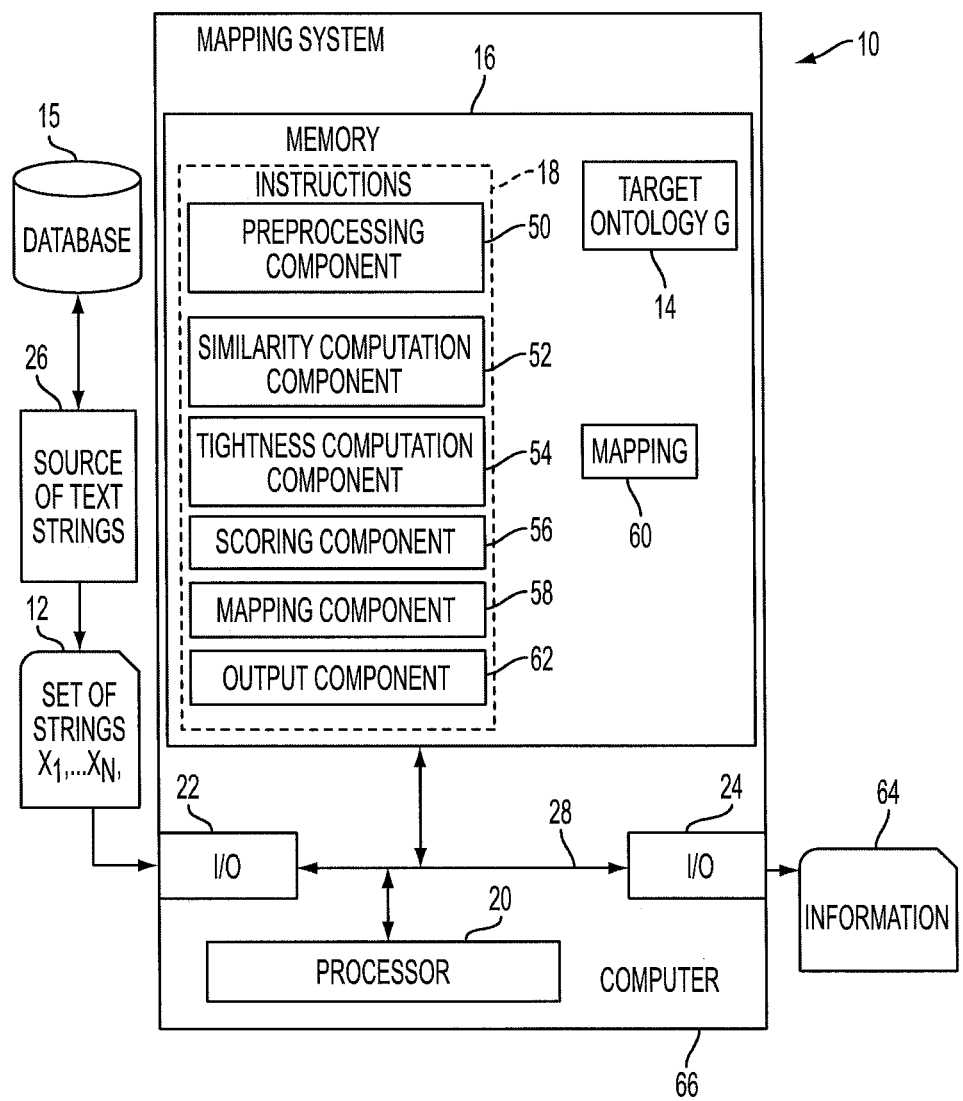
FIG. 1 is a functional block diagram of a system for matching strings onto an existing ontology in accordance with one aspect of the exemplary embodiment.

With reference to FIG. 1, a system 10 for mapping a set 12 of related strings $x_1, \ldots x_n$, onto a target ontology 14 is shown. The target ontology may be, or be derived from, an existing proprietary knowledge base or be all a part of a publically-available knowledge base, such as DBpedia, and may have a graph structure. The strings 12 may have been derived from querying a database 15 with queries and the responses (e.g., in a serialized data format, such as JSON (JavaScript Object Notation) files) are processed to extract the (JSON) objects mentioned as a set of strings. The extracted objects in JSON can include simple objects, such as number, string, and Boolean objects, and compound types of object, such as dictionary and list objects.

Figure 2:
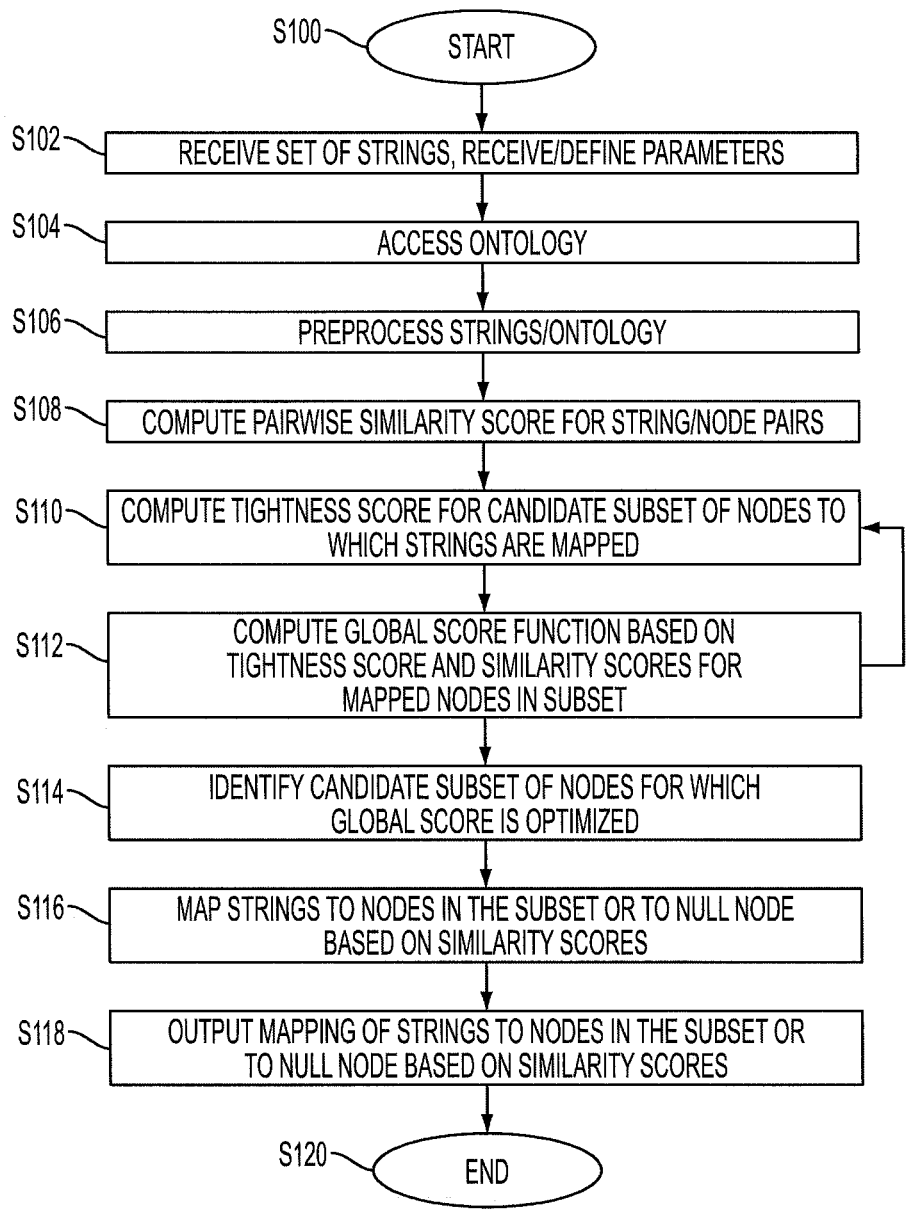
FIG. 2 is a low chart illustrating a method for matching strings onto an ontology in accordance with one aspect of the exemplary embodiment.

The system includes memory 16, which stores instructions 18 for performing the exemplary method illustrated in FIG. 2, and a processor 20 in communication with the memory for executing the instructions. One or more input/output (I/O) devices 22, 24 allow the system to communicate with external devices, such as a source 26 of the text strings. Hardware components 16, 20, 22, 24 of the system communicate via a data control bus 28.

Figure 3:
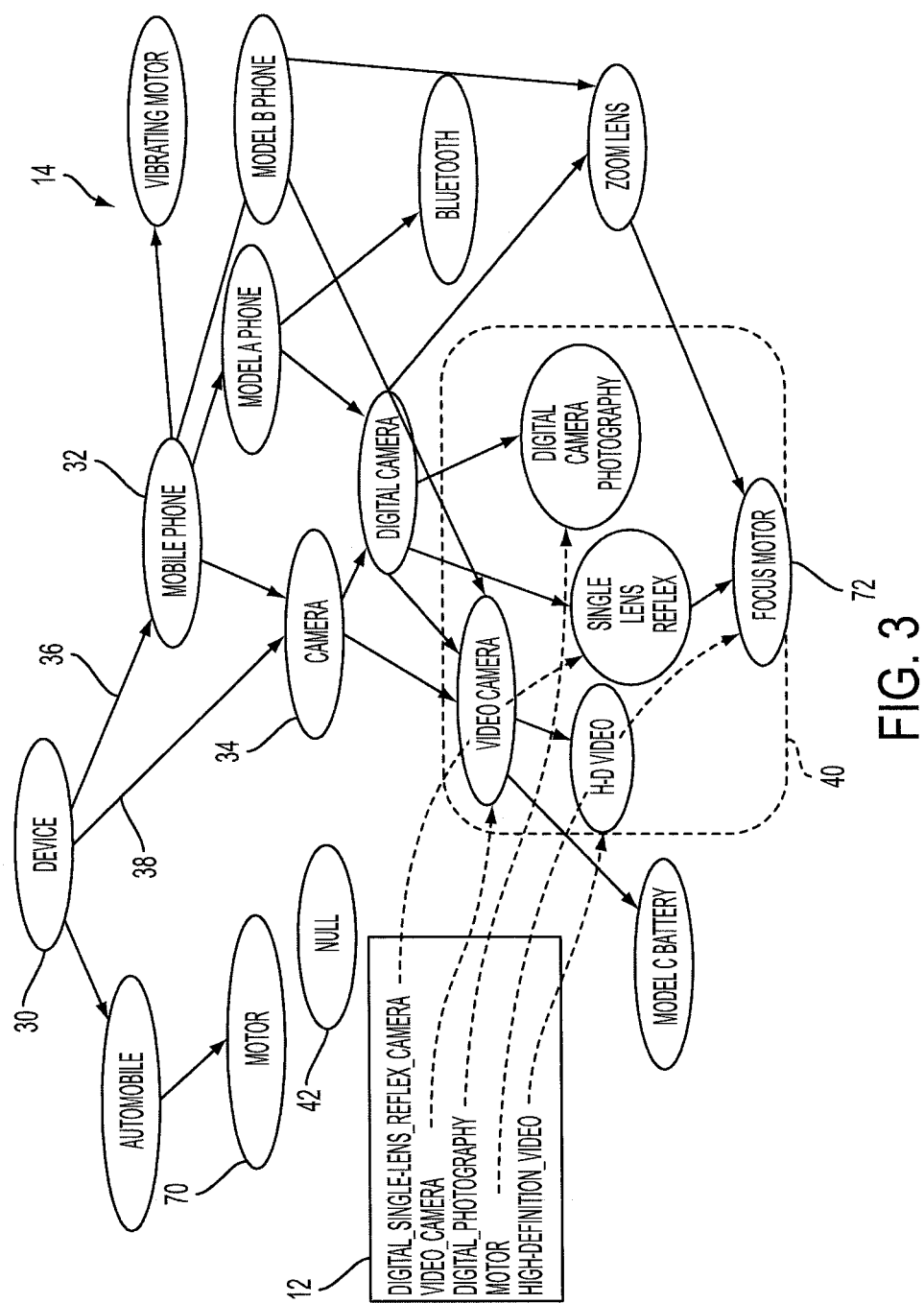
FIG. 3 illustrates an example matching problem.

As illustrated, for example, in FIG. 3, each string $x_1, \ldots x_n$, in the set 12 includes a sequence of one or more terms (e.g., words, web address, etc.), each term comprising a sequence of one or more characters, which may be drawn from a finite alphabet (e.g., letters and numbers). The ontology 14 can be in the form of a graph, such as a directed-acyclic graph (DAG) (each node has 0, 1 or more parents) or a tree (each node has 0 or 1 parents, and in which any two nodes are connected by exactly one path). The graph includes a set of nodes $\{y_1, \ldots, y_k\}$. The nodes, e.g., illustrated at 30, 32, 34, etc., each have a name representing an ontology object, such as the name of a thing. The nodes are linked by edges, 36, 38, etc. In the exemplary embodiment, the edges may denote relationships between the objects. However, the relationships between the strings $x_1, \ldots x_n$, other than the fact that they are in some way related, are either not known to the system 10, or may be quite diverse (as in the case of JSON files), and may be ignored. Accordingly, in the exemplary embodiment, no weights are placed on the edges 36, 38, etc. A subgraph, as exemplified at 40, includes fewer than all the nodes of the ontology, together with the edges that connect them.

The goal is to map each string $x_1, \ldots x_n$, in the set 12 to a respective object (node) in the target ontology 14, or to a special node null 42 if no equivalent object exists, and to have the overall mapping tightly concentrated in a subgraph 40.

With reference once more to FIG. 1, the instructions 18 optionally include a preprocessing component 50, which may preprocess the input strings and/or the ontology nodes to enrich them with variants. This may include splitting the string/node name into a sequence of terms (e.g., by identifying white space between characters and/or capital letters), removing stop words (like "the" or "a"), lemmatizing words (converting plural forms to singular, verbs to the infinitive form), identifying strings likely corresponding to acronyms (e.g., using a look-up dictionary), or any other preprocessing suited to the type of strings/ontology being processed.

A similarity computation 52 component computes a measure of local similarity sim between each (optionally preprocessed) string $x_1, \ldots x_n$ and each node in the ontology 14. The exemplary pairwise similarity function sim determines how probable it is that its two parameters (a string and an object) are equivalent, without taking into account the context in which they occur (such as the relationships denoted by the edges of the graph or any relationships between the text strings). A threshold similarity, sim(n, null)=θ, is a small value that thresholds the minimal similarity a string should have to a node. If the threshold is not met for any of the nodes, the null node 40 is assigned as the most similar node to the string.

A tightness computation component 54 component computes, for each of a set of candidate subsets of the nodes in the ontology 14 to be mapped to the set of strings, a tightness score for the candidate subset of the nodes. The tightness score considers the context of the subset of nodes to which the set of strings is mapped.

A scoring component 56 computes a global score function which optimizes (maximizes) a mapping for the set of strings on a candidate subset of nodes, taking into account the sim scores and the tightness score. The scoring component 54 identifies an optimal subset of the nodes to which the strings $x_1, \ldots x_n$ are to be mapped, based on the global score function.

A mapping component 58 generates a mapping 60 between each of the strings in the set 12 and a respective node in the optimal subset (or the null node if the similarity with any of the nodes in the subset does not meet the threshold). The set of strings (e.g., the database 15 from which they were extracted) can then be enriched with information from the ontology 14, such as the names of the nodes to which they are each mapped and/or other information associated with the nodes, such as information on their ancestor and/or descendant nodes.

An output component 62 outputs information 64 based on the identified mapping 60 which has provided an optimal score for the global score function.

The computer-implemented system 10 may include one or more computing devices 66, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 16 may represent any type of non-transitory computer readable medium such as random access memory (RAM), read only memory (ROM), magnetic disk or tape, optical disk, flash memory, or holographic memory. In one embodiment, the memory 16 comprises a combination of random access memory and read only memory. In some embodiments, the processor 20 and memory 16 may be combined in a single chip. Memory 16 stores instructions for performing the exemplary method as well as the processed data 58.

The network interface 22, 24 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 66, executes instructions stored in memory 16 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

FIG. 2 illustrates a method for mapping a set of strings onto an ontology. The method begins at S100.

At S102, a set 12 of strings is received by the system and may be stored in memory 16 during processing. The strings may be received by submitting queries to one or more web services 26 which retrieve responses in the form of serialized data, the serialized data being processed to identify strings corresponding to data objects. Parameters (a similarity threshold θ and a weighting parameter λ) may be received and/or defined, if not previously done.

At S104, access is provided to an ontology 14 or part thereof, to which the strings are to be mapped. The ontology includes a set of nodes, each with a name of an object. A null node may be added to the ontology 14 for mapping strings that do not meet a given similarity threshold. To reduce computation time when the ontology is very large (e.g., as in the case of DBpedia) a portion of the ontology which is of particularly relevance may be identified, for example by using a query service to get potentially similar nodes to the strings and retaining the edges and intermediate nodes that connect them.

At S106, the strings 12 and/or the ontology nodes 30, 32, etc., are optionally preprocessed, by the preprocessing component 50, to enrich them with variants.

At S108, a pairwise similarity score sim is computed, by the similarity computation component 52, for each of the strings in the set 12 with each node of the ontology 14.

At S110, a tightness score is computed, by the tightness computation component 54, for a candidate subset of the nodes.

At S112, a global score is computed by the scoring component 56 as a function of the local similarity scores and the tightness score for the subset of the nodes and the weighting parameter A.

S110 and S112 are repeated a plurality of times (using other candidate subsets of nodes) to identify a candidate subset with an optimal global score. A "plurality," as used herein, means at least two, although in general, these steps may be repeated many more times, such as at least 10 or at least 100 times. The subset of nodes 40 for which the optimal score is generated is identified as the optimal subset (S114).

At S116, the strings in the set 12 are each mapped, by the mapping component 58, to the node in the optimal subset 40 for which the highest pairwise is computed, or to the null node 42 if there is no node in the optimal subset 40 with which the pairwise similarity meets the similarity threshold θ.

At S118, information 64 is output, by the output component 62, which may include the mapping 60 generated by the mapping component or information based thereon, such as information relating to the nodes in the ontology identified in the mapping. For example information may be used to enrich a legacy database from which the strings are extracted by adding information to objects in the database corresponding to the strings which is derived from the objects in the ontology to which these strings are mapped.

The method ends at S120.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 66, (for example, an internal hard drive of RAM), or may be separate (for example, an external hard drive operatively connected with the computer 66), or may be separate and accessed via a digital data network such as a local area network (LAN) or the Internet (for example, as a redundant array of inexpensive of independent disks (RAID) or other network server storage that is indirectly accessed by the computer 66, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for mapping strings. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Further details on the exemplary system and method will now be provided.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value. Rather than attempting to optimize a discrete set function, the method may attempt to optimize a real function.

The similarity function sim used by the similarity computation component 52 at S108 may employ any suitable measure for computing similarity between strings, such as the Levenshtein distance, number of matching characters, or any other suitable string matching measure. In computing the sim function between the string and each of the nodes, each string is considered individually, without reference to the other strings in the set. As will be appreciated from the foregoing, the similarity function is not utilized on its own to compute the mapping. As an example, in FIG. 3, the node motor 70 in the ontology 14 may have a much higher similarity to the string motor than does the node focus motor 72, but if the context is about camera devices and their applications, then the tightness score may favor the focus motor node 72 in the final mapping 60.

Unlike conventional coreference problems in natural language processing, the only context for the strings being mapped is the fact that the string is related to the other strings in the input set. These other strings do not have to map directly to immediate neighbors of the referred object, as the ontology 14 may be much more detailed, but they should definitively be closer compared to another interpretation of the term. The exemplary global optimization score includes a connectivity (tightness) score $\text{tightness}_G(Y)$ on a subset of the ontology nodes which computes how tight the final induced subgraph 40 is.

Give a set of strings $x_1, \ldots x_n$, and an ontology $G=(V,E)$, where V represents the set of nodes and E represents the set of edges connecting them, the scoring component 56 seeks to identify a subset of the nodes $\{y_1, \ldots y_k\}=Y\subseteq V$, in order to maximize a global score S which is a function of similarity of the strings to a subset of the nodes (local alignment) and a measure of the tightness of those nodes (global alignment). The global score function may be defined as:

$$\text{Global score } S = \left(\sum_i \max_{y \in Y} sim(x_i, y)\right) + \lambda \, \text{tightness}_G(Y) \quad (1)$$

This combines a local matching (the first term in Eqn. (1)) with a global property on the whole subset Y. The subset of nodes Y induces the subgraph (Y,E) of G. The sum $$\sum_i \max_{y \in Y} sim(x_i, y)$$

identifies, for each string $x_i$ in the set 12, the node y in the subset Y to which its similarity score is the highest and adds these similarity scores together. λ is a parameter which determines the relative importance of similarity and tightness to the overall global score. λ is non-zero. For example, 0<Δ<1, e.g., 0.1<λ<0.3. Δ can be selected manually, by evaluation of results for different values of λ, or automatically, using labeled training data.

This combination of a local matching with a global property tends to make the function ill-suited to conventional matching algorithms. Additionally, in the exemplary embodiment, more than one string can match a given node. The matching thus allows several strings (x) to match to the same node (y), a desirable property for some use cases.

The problem of finding the subset of nodes Y which optimizes the global score S can be solved by choosing a tightness function $tightness_G(Y)$ which is submodular and using existing techniques for combinatorial optimization of S.

A submodular set function (also known as a submodular function) is a set function whose value, informally, has the property that the difference in the value of the function that a single element makes when added to an input set decreases as the size of the input set increases. Submodular functions have a natural diminishing returns property.

Give a universe V, a set function $f: 2^V \to \mathcal{R}$ is submodular if and only if:

for every $X \subseteq Y \subseteq V, x \notin Y, f(X \cup \{x\}) - f(X) \geq f(Y \cup \{x\}) - f(Y)$ (2)

which is a formal definition of the diminishing return property: adding a new value x to a set (of nodes) Y brings less (or equal) gain to the function of Y than it does to the function of X, when adding it to a smaller set (of nodes) X. Supermodularity is the opposite property (replacing the ≥ with a ≤ in Eqn. (2)).

See, e.g., http://en.wikipedia.org/wiki/Submodular_set_function for a fuller description of submodular functions.

A submodular function can be minimized in polynomial time, but the general problem of maximizing no-constraint submodular functions is NP-Hard. A method which gives an 0.5 approximation for this general problem, through a linear, randomized algorithm is described in Niv Buchbinder, et al., "A tight linear time (½)-approximation for unconstrained submodular maximization," 2012 IEEE 53rd Annual Symp. on Foundations of Computer Science (FOCS), pp. 649-658. (2012), hereinafter, "Buchbinder, et al." This algorithm randomly starts with two solutions, one empty and the other a large set of nodes (e.g. V) and arbitrary selects nodes and determines whether it would provide more gain to the score by adding the node to the smaller set or removing from the larger. Buchbinder describes a more complex method for randomly selecting whether to add or remove the node from the respective sets based on probabilities of the respective gains to provide a tight (½)-approximation with a smoother decision.

In the present case, it is assumed that if tightness(Y) is submodular, then Eqn. (1) is submodular.

In the exemplary embodiment, the tightness of a candidate subset of nodes Y may be computed as a function of the sum of their distances, e.g.:

$tightness_G(Y) = -\Sigma_{i,j} d(y_i, y_j)$ (2)

This sums the distance between each pair of nodes in the candidate subset. The distance between any two nodes can be set as the number of edges that separate them. Because each added node adds its distance to all existing nodes, the sum is clearly super-modular and thus applying the minus operator makes it submodular. For completeness, it is assumed that the distance to the null node from each of the nodes in the subset is a constant value (e.g., d(i,null)=0). To reduce computation time, the distances for nodes which are at least a threshold distance apart may all be set to the same, predefined fixed value α, such as α=10 for all nodes that are at least 4 or at least 5 edges apart.

Thus, for example, consider a subgraph of nodes 30, 34, and 70. The distance between nodes 30 and 70 is 2, between nodes 70 and 34 is 3, and between nodes 30 and 34 is 1. Assume that the threshold distance is 4, then since all the nodes are less than 4 edges apart, tightness(Y) for the subset of nodes 30, 70, and 34 thus equals −(2+3+1)=−6.

In another embodiment, the subgraph tightness is computed as a function of the graph diameter of the induced subgraph (Y,E):

$tightness_G(Y) = -\max_{i,j} d(y_i, y_j)$.

In the above example the maximum distance between any of the nodes 30, 34, and 70 in the subgraph is 3, thus tightness(Y)=−3.

In another embodiment, the subgraph tightness is computed as a function of the size of a minimum tree over E spanning all of Y (a variation of the standard minimum spanning tree problem). In the above example, the minimum size of tree which includes nodes 30, 34, and 70 is 4.

The latter two methods, however, may create non-obvious optimization problems and there may not be an algorithm to solve them efficiently, since neither of them is submodular or super-modular.

The method addresses the problem of matching noisy data (e.g., data with an inconsistent and non-coherent structure) to an ontology, using an optimization function whose goal is to find a good set of nodes in the target ontology that match a set of related strings. The global tightness parameter is found to be more adapted to this task than the notion of density used elsewhere (see, Andrea Moro, et al., "Entity linking meets word sense disambiguation: a unified approach," TACL, 2:231-244 (2014), hereinafter, "Moro, et al."). Since in the exemplary embodiment, tightness can be shown to be submodular, this leads to desirable computational characteristics.

The exemplary method finds application in the semi-automatic extraction of content from legacy knowledge bases and mapping them to a generic ontology. The method may also have application in other tasks that deal with graph matching, such as Named Entity Recognition and Disambiguation.

The exemplary tightness measure differs from the definition of density, which has been previously used in connection with graphs. A graph is dense if most of its nodes are connected, with complete graphs being maximally dense. Several algorithms for finding quasi-cliques exist, such as Charalampos Tsourakakis, et al., "Denser than the densest subgraph: Extracting optimal quasi-cliques with quality guarantees," Proc. 19th ACM SIGKDD Intern'l Conf. on Knowledge Discovery and Data Mining, KDD '13, pp. 104-112 (2013). However, while a dense graph is generally tight the opposite is not true: a star for instance has a shortest path of two between any pair of nodes while being able to increase its sparsity by adding nodes to the periphery of the star. The tightness score is better suited to the present string matching case. While identifying densest subgraph is known to be polynomial (A. V. Goldberg, "Finding a maximum density subgraph," Technical report, Berkeley, Calif., USA, (1984)), variations of the problem (like identifying the densest subgraph of size at least k) are NP-hard (Uriel Feige, et al., "The dense k-subgraph problem," Algorithmica, 29(3):410-421 (2001)). The exemplary tightness score is submodular, making it readily computable with known optimization techniques.

Without intending to limit the scope of the exemplary embodiment, the following examples demonstrate the applicability of the method to strings extracted from a proprietary database.

EXAMPLES

To evaluate the method, different sets of strings were extracted from a device database. The original format orders these strings in a tree-like manner (through a JSON service). However, the semantics of the edges varies considerably. For example, an edge may denote a sub-class relationship, an is-property-of or just a loose is-related. By simply considering the objects as a non-ordered set, complications due to this diverse interpretation of the relationships are avoided, while at the same time making it more generic.

Some of these sets include non-entity strings (like unique ID's or version identifiers). These strings will generally be mapped to null. For the ontology DBpedia, a structured view of the Wikipedia project, was used. The DBpedia knowledge base currently describes about four million things, of which at least three million are classified in a consistent ontology, including persons, places, creative works, organizations species, and diseases. To speed up the process further, not all possible nodes of this ontology were considered. Instead, a query service (DBpedia Lookup) was used to get potential similar nodes (http://lookup.dbpedia.org/). The DBpedia Lookup query service is a web service that can be used to look up DBpedia URIs by related keywords. Related, in this context, is stated to mean that either the label of a resource matches, or an anchor text that was frequently used in Wikipedia to refer to a specific resource matches (for example the resource http://dbpedia.org/resource/United_States can be looked up by the string "USA"). The results are ranked by the number of inlinks pointing from other Wikipedia pages at a result page.

To expand the candidate universe of nodes, the original strings were split by whitespace and capital letter and a concatenation of these was also used as search terms for the DBpedia Lookup query service.

The top 5 hits in the DBpedia ontology for each string were retained, which together constituted the candidate set forming the ontology 14. Over this universe, a search was performed for the optimal subset on which to match the input strings. For the similarity function, the standard edit distance was used, normalized by the length of the longer of both strings. As a simplification, the text inside any parentheses was ignored (so Ajax_(programming) would be compared as if it were Ajax). An additional speed up was to threshold the shortest-path computation at 4. That is, if two nodes are further apart than that, their distance is set to a fixed pre-defined value (10 in the example). The settings of the parameters were $\lambda=0.01$, $\theta=0.15$, (found by testing a few different parameters and selecting the best). The linear double-greedy algorithm of Buchbinder, et al., was used, which ensures a result that is at least 0.5 the optimal. Because the Buchbinder, et al., algorithm is a randomized one and because (once the shortest paths are computed) it is extremely fast, it was run 1000 times and the candidate subset giving the best result was retained.

The process finishes by assigning each string to the node in the subgraph to which it has maximal similarity. When this similarity is below $\theta$ it is assigned to null: this takes care of all identifiers in the example case. Tables 1-3 illustrate results obtained.

The method was compared with an approach that looks for dense subgraphs, using an approximation based on Moro, et al. In this approach, the node having the lowest degree (with respect to the current subset of nodes) is iteratively removed and each one of these intermediate graphs is considered as a possible solution. Eqn. (1) is then applied, replacing the tightness term with $$\frac{|E|}{|V|}$$

on each of these subset of vertices and the best returned. This approach appeared more sensitive to the selection of the $\lambda$ parameter: a small variation produced huge disparities in the size of the resulting graph. As with the tightness approach, a few different parameters were evaluated and the best selected (set once for each strategy). For the density, $\lambda=3$ was chosen. However, the resulting graphs, while very dense, failed to include more distant entities that were linked to only some of the other nodes. For instance, JavaScript was not included in the dense solution, most probably because it is not directly connected to many of the other correct nodes. Instead, OS_X was included, because it is densely connected to many of the other nodes (Apple_Inc., Safari, IOS).

The results for three different sets of strings are shown in Tables 1 to 3. X denotes the original set 12 of strings, V the candidate set in the ontology 14, dense the result obtained using density of the induced subgraph as global alignment, and the last column denotes the top candidate subset retrieved by using the exemplary tightness score in the global scoring function.

TABLE 1

| X | V | dense | tightness |
|---|---|---|---|
| 4855 | 3D_film | Blackberry | Camera |
| BlackBerry | BlackBerry_Curve | OS_X | BlackBerry_OS |
| Curve 8330 | Radius | Light | BlackBerry |
| CameraDigitalZoom | Blackberry | Hubble_Space_Telescope | |
| Camera | Digital_camera | Rubus | |
| CameraOpticalZoom | Primetime_Emmy_Award | IOS | |
| RIM | Zoom_lens | | |
| 88 | Closed-circuit_television | | |
| BlackBerry OS 4.7.0 | Integral | | |
| | BlackBerry_OS | | |
| | Digital_photography | | |

TABLE 1-continued

| X | V | dense | tightness |
|---|---|---|---|
| | DV | | |
| | Video_camera | | |
| | BlackBerry | | |
| | Research_In_Motion | | |
| | Camera | | |
| | Rubus | | |
| | Solanaceae | | |
| | Wheel | | |
| | Digital_single-lens_reflex_camera | | |
| | Index_of_articles_related_to_BlackBerry_OS | | |
| | 8330_Fitzroy | | |
| | Grand_Canyon | | |
| | Digital_zoom | | |
| | etc | | |

It this simplified example, RMI is not mapped correctly (i.e., is mapped to null), likely because the similarity measure used did not take into account acronyms. Also, Digital_zoom is a non-connected component in DBpedia: when it was connected to Camera it was included into the optimal solution.

TABLE 2

| X | V | dense | tightness |
|---|---|---|---|
| 26192 | Internet_access | Samsung_Electronics | Android_(operating_system) |
| Samsung | Rooting_(Android_OS) | IOS | Google |
| Galaxy S II D710 | Samsung_Electronics | Samsung | Bluetooth |
| 204 | Xbox_Live | Bluetooth_Special_Interest_Group | Samsung |
| Android OS 4.2 | Connected_space | Samsung_Lions | Side_platform |
| Google | Samsung | OS_X | |
| CPU | Bluetooth_low_energy | Android_(operating_system) | |
| Samsung S5PC210 | Android_(operating_system) | Suwon_Samsung_Bluewings | |
| HardwarePlatform | Porting | Samsung_Galaxy_S_II | |
| Bluetooth | Embedded_system | Google | |
| Connectivity | Wireless_network | X86 | |
| | Central_processing_unit | Google_Earth | |
| | Samsung_Galaxy_S_II | Microsoft_Windows | |
| | X86 | Bluetooth | |
| | Industrial_design | | |
| | Google | | |
| | Microprocessor | | |
| | Side_platform | | |
| | Bluetooth_Special_Interest_Group | | |
| | Samsung_Lions | | |
| | Suwon_Samsung_Bluewings | | |
| | etc | | |

Here, the inclusion of Side_platform (due to its similarity to HardwardPlatform and its surprising closeness to many of the other in the final set), and the exclusion of Galaxy_S_II, were errors in the tightness result.

TABLE 3

| S | V | dense | tightness |
|---|---|---|---|
| 18574 | Species | OS_X | Apple_Inc. |
| Apple | OS_X | IOS | JavaScript |
| iPhone 4 | FaceTime | Apple_Inc. | Safari_(web_browser) |
| AT&T | | | |
| Battery | IPhone | Web_browser | IPhone |
| BatteryType | Sulfuric_acid | Firefox | Battery_(electricity) |
| Li-ion | IOS | Safari_(web_browser) | |
| BrowserName | Game_reserve | | |
| Safari | Köppen_climate_classification | | |
| JavaScriptVersion | Apple_Inc. | | |

TABLE 3-continued

| S | V | dense | tightness |
|---|---|---|---|
| 1.7 | Safari_Rally | | |
| | JavaScript | | |
| | Type_species | | |
| | IPhone_4 | | |
| | Battery_(electricity) | | |
| | Anti-aircraft_warfare | | |
| | Safari | | |
| | Holotype | | |
| | Web_application | | |
| | Plug-in_(computing) | | |
| | Surname | | |
| | Li-ion_Motors | | |
| | Pseudonym | | |
| | Web_browser | | |
| | Firefox | | |
| | Lithium-ion_battery | | |
| | Citroën_DS | | |
| | IPhone_4S | | |
| | Lithium-ion_polymer_battery | | |
| | Macintosh | | |
| | Rock_(geology) | | |
| | Safari_(web_browser) | | |
| | etc | | |

Here, Li-ion is not mapped to any of the possible candidates, likely because the comparison weights equally the trailing and starting characters.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for mapping a set of strings onto an ontology comprising:
   receiving a set of strings, each string denoting a respective object;
   for each of the strings, each string comprising a sequence of one or more terms, each of the terms comprising a sequence of one or more characters, computing a pairwise similarity between the string and each of a set of objects in an ontology without taking into account the context in which the ontology objects occur in the ontology, the computing a pairwise similarity comprising computing a string matching measure based on an edit distance between the characters of the respective string and the respective object, wherein the objects in the ontology are represented as nodes of a graph connected by edges, and wherein the context in which the ontology objects occur includes relationships denoted by the edges of the graph;
   for each of a set of at least two candidate subsets of the set of objects, each candidate subset inducing a respective subgraph of the graph, the respective subgraph including a respective subset of the objects in the set of objects, computing a global score which is a function of the pairwise similarities between the strings and the objects in the subset and a tightness score computed on the objects in the subset with a submodular function, the tightness score being computed as a function of the sum of the distance between each pair of objects in the subset;
   identifying an optimal subset from the set of candidate subsets based on the global scores;
   mapping strings in the set of strings to the objects in the identified optimal subset based on the pairwise similarities; and
   enriching the set of strings, or the objects to which they refer, with information from the ontology, based on the mapping;
   wherein at least one of the computing of the global score, the identifying of the optimal subset, and the mapping of the strings is performed with a processor.

2. The method of claim 1, wherein the tightness score is computed as a function of distances between nodes of the ontology representing the subset of objects.

3. The method of claim 1, wherein the mapping strings in the set of strings to the nodes in the optimal subset comprises mapping each of the strings in the set of strings to the object with the highest pairwise similarity where that pairwise similarity meets a predefined threshold and otherwise to a null node.

4. The method of claim 1, wherein the computing a pairwise similarity comprises computing a number of matching characters between the respective string and the respective object.

5. The method of claim 1, wherein the computing a pairwise similarity comprises computing the Levenshtein distance between the respective string and the respective object.

6. The method of claim 1, wherein the strings comprise serialized data received in response to queries from a common source.

7. The method of claim 6, wherein the strings comprise JSON objects.

8. The method of claim 1, wherein in mapping strings in the set of strings to the objects in the optimal subset based on the pairwise similarities more than one string is allowed to map to a given one of the objects.

9. The method of claim 1, wherein the output information includes at least one of:
   the mapping; and
   information based on the mapping.

10. A computer program product comprising a non-transitory recording medium storing instructions, which when executed on a computer causes the computer to perform the method of claim 1.

11. A system comprising memory storing instructions for performing the method of claim 1 and a processor in communication with the memory which executes the instructions.

12. A method for mapping a set of strings onto an ontology comprising:

receiving a set of strings, each string denoting a respective object;

for each of the strings, computing a pairwise similarity between the string and each of a set of objects in an ontology;

for each of a set of candidate subsets of the set of objects, computing a global score which is a function of the pairwise similarities between the strings and the objects in the subset and a tightness score computed on the objects in the subset with a submodular function, wherein the global score for a candidate subset is computed as:

$$\text{global score } S = \left(\sum_i \max_{y \in Y} sim(x_i, y)\right) + \lambda \, \text{tightness}_G(Y), \quad (1)$$

where each $x_i$ represents one of the strings,
each y represents an object in the candidate subset, $$\max_{y \in Y} sim(x_i, y)$$

is the maximum similarity between the string $x_i$ and all the objects in the subset;
tightness$_G$(Y) represents the tightness score computed on the objects in the subset, and
$\lambda$ represents a fixed parameter which is non-zero;

identifying an optimal subset from the set of candidate subsets based on the global scores;
mapping strings in the set of strings to the objects in the optimal subset based on the pairwise similarities; and
outputting information based on the mapping;
wherein at least one of the computing of the global score, the identifying of the optimal subset, and the mapping of the strings is performed with a processor.

13. A method for mapping a set of strings onto an ontology comprising:

receiving a set of strings, each string denoting a respective object;

for each of the strings, computing a pairwise similarity between the string and each of a set of objects in an ontology, the objects in the ontology being represented as nodes of a graph;

for each of a set of candidate subsets Y of the set of objects, computing a global score which is a function of the pairwise similarities between the strings and the objects in the subset and a tightness score computed on the objects in the subset with a submodular function, wherein the tightness score is computed as:

$$\text{tightness}_G(Y) = -\Sigma_{i,j} d(y_i, y_j) \quad (2)$$

where $d(y_i, y_j)$ represents a distance between one of the nodes and another of the nodes in the candidate subset Y;

identifying an optimal subset from the set of candidate subsets based on the global scores;
mapping strings in the set of strings to the objects in the optimal subset based on the pairwise similarities; and
outputting information based on the mapping;
wherein at least one of the computing of the global score, the identifying of the optimal subset, and the mapping of the strings is performed with a processor.

14. The method of claim 13, wherein when a string from the set of strings does not meet a threshold similarity with any of the nodes in the ontology, a null node is added to the ontology and is considered as the most similar node for that string, and wherein a distance between each node in the subset and the null node is set to a fixed value.

15. The method of claim 13, wherein the distance between one of the nodes and another of the nodes in the subset is based on a number of edges separating the nodes.

16. The method of claim 15, wherein for nodes which are at least a threshold number of edges apart, the distance is set to a fixed value.

17. A system for mapping a set of strings onto an ontology comprising:

a similarity computation component which, for each of a set of received strings, computes a pairwise similarity between the string and each of a set of objects in an ontology;

a scoring component which, for each of a set of candidate subsets of the set of objects, computes a global score which is a function of the pairwise similarities between the strings and the objects in the subset and a tightness score computed on the objects in the subset with a submodular function, and which identifies an optimal subset from the set of candidate subsets based on the global scores, wherein the global score for a candidate subset is computed as:

$$\text{global score } S = \left(\sum_i \max_{y \in Y} sim(x_i, y)\right) + \lambda \, \text{tightness}_G(Y), \quad (1)$$

where each $x_i$ represents one of the strings,
each y represents an object in the candidate subset, $$\max_{y \in Y} sim(x_i, y)$$

is the maximum similarity between the string $x_i$ and all the objects in the subset;
tightness$_G$(Y) represents the tightness score computed on the objects in the subset, and
$\lambda$ represents a fixed parameter which is non-zero;
a mapping component which maps each of the strings in the set of strings to the objects in the optimal subset based on the pairwise similarities or to a null node when the pairwise similarity does not meet a threshold for any of the nodes in the optimal subset;
an output component which outputs information based on the mapping the information enriching the set of strings, or the objects to which they refer, with information from the ontology; and
a processor which implements the similarity computation component, scoring component, mapping component, and output component.

18. The system of claim 17, further comprising a tightness computation component which computes the tightness score.

\* \* \* \* \*